Patented Aug. 17, 1937

2,090,394

UNITED STATES PATENT OFFICE 2,090,394

TARS FOR USE IN ROAD CONSTRUCTION

Alfred Sirot and Georg Wick, Bitterfeld, Germany, assignors to I. G. Farbenindustrie Aktiengesellschaft, Frankfort - on - the - Main, Germany No Drawing. Application September 23, 1936, Serial No. 102,247. In Germany September 28, 1935

9 Claims. (Cl. 106—32)

The present invention relates to improvements in tars for use in road construction and particularly their binding properties.

In an application for United States Letters Patent bearing Serial Number 28,874, which was filed by Ernst Bürgin on June 29, 1935, under the title of Binding agents for road construction, there is described and claimed a method of improving the binding properties of tars (for instance coal tars) used in the construction of roads, by incorporating with said tars a small proportion of a chlorinated polyvinylchloride, the said latter substance being either dissolved in the tar to be treated in the form of a powder or added thereto in the form of a solution in a suitable solvent which is then mixed with the tar. In this manner the properties of tars on which their utility as binding agents in road construction is dependent, are improved to a high degree.

It has now been ascertained in accordance with the present invention that a similar improvement of the binding qualities of tars is brought about by the addition, to prepared or distilled tars, of a similar proportion of a polyvinylchloride which has not been subjected to a special after-chlorination, provided that the incorporation of the unchlorinated polyvinylchloride in the tar is carried out while maintaining certain essential conditions of working.

According to one embodiment of the invention a solution prepared by dissolving a few tenths of one per cent. of the weight of the tar to be treated, of polyvinylchloride, in one of the customary solvents for polyvinylchloride (such as cyclohexanone, or tar oils, such as anthracene oil, heavy oil or middle oil) is added to and thoroughly mixed with the heated tar. The amount of polyvinylchloride thus added may, for example be 0.3% of the weight of the latter, and the tar may be heated to 100 to 120° C.

According to an alternative embodiment of the invention, a similar proportion of polyvinylchloride may be stirred with the tar directly in the form of a powder and the mixture then heated for a prolonged period, at least for about one hour, at a temperature of at least 130° C. at atmospheric pressure, or at a somewhat lower temperature when a pressure exceeding atmospheric is applied. As, however, such prolonged heat treatment of the tar may result in a deterioration of its qualities in other respects, the introduction of the polyvinylchloride with the aid of a suitable solvent is generally preferable.

We have found that in view of the limited capacity, of the customary tars, of dissolving polyvinylchloride it is preferable to employ a polyvinylchloride of a high degree of polymerization, for instance one represented by an M-number greater than 10, since the higher the degree of polymerization of the polyvinylchloride, the smaller is the proportion of that substance required to produce a certain definite improvement. In cases, however, where the solvent capacity of the tar permits the solution of a greater proportion of polyvinylchloride by the application of the methods above described, the same effect may also be produced by the use of a larger proportion of polyvinylchloride of a lower degree of polymerization.

(The M-number serves as a measure of the polymerization of polyvinylchloride and means the weight in grams of the quantity of a solvent consisting of 25% of epichlorhydrine and 75% of monochlorobenzene, which is required in order to effect complete gelatinization, within 6 minutes, of 1 gram of polyvinylchloride after the solution has been cooled to 20° C., the mixture remaining fluid during the cooling.)

The following comparative tests are representative of the improvement in ductility of the tars treated according to the invention in comparison with the original untreated tars:

Two metal thimbles A and B, the bottom of each being provided with a perforation of 3 mms. internal diameter, are filled with about 1 ccm. of a road tar consisting of 25 parts of anthracene oil and 75 parts of coal tar pitch of a softening point of 67° according to Kraemer-Sarnow. The tar in thimble A has been treated according to the invention with the addition of 0.5% of polyvinylchloride, whereas the tar in thimble B is untreated. In dripping through the perforation of the thimble at a temperature of 25° C. the tar in A extends into a thread of more than 5.50 ms. length before rupture of the thread occurs, whereas the tar flowing from thimble B forms a thread which disrupts after a length of only 60 cms. has been attained. At the same time, the viscosity of the tar in thimble A differs only inappreciably from that in thimble B.

*Example*

100 parts by weight of a coal tar consisting of 75 parts of coal tar pitch of a softening point of 67° (according to Kraemer-Sarnow) and 25 parts of anthracene oil are heated to about 120°. 5 parts of a clear solution containing 10% of polyvinylchloride of M-number 35 in anthracene oil (produced by heating the mixture at 120°) are added to the heated tar and intimately mixed therewith by stirring, the mixture finally obtained thus containing 0.5% of the aforesaid polyvinylchloride.

As compared with the original tar which has a dripping point of 39° (according to Ubbelohde) and a viscosity (measured in the road-tar-consistometer at 50° C. and with an outflow opening of 10 mms. width) of 45.5 seconds, the corresponding constants of the tar treated in accordance with the invention with polyvinylchloride are 40.1° and 60.9 seconds, and thus differ only inconsiderably from the former. The length of the thread of the treated tar amounts to over 6 ms., whereas that of the untreated tar only attains 60 cms.

When testing the ductility by the Dow method the dripping point of the tar treated with polyvinylchloride is, for the purpose of obtaining comparable values, adjusted to 39° by the addition of anthracene oil. The ductility determined at 15° C., is found to be 86 cms. and the thickness of the thread to be 86μ, at the moment of rupture, for the untreated tar; the corresponding values for the treated tar being 105 cms. and about 1500μ.

We claim:

1. A process of improving tars for use in road construction and particularly their binding properties which comprises incorporating in the tar a small quantity of an unchlorinated polyvinylchloride.

2. A process of improving tars for use in road construction and particularly their binding properties which comprises heating the tar to a temperature of between about 100 and about 150° C. and incorporating in said tar a small quantity of an unchlorinated polyvinylchloride.

3. A process of improving tars for use in road construction and particularly their binding properties which comprises heating the tar to a temperature between about 100 and about 120° C. and adding to said tar a few tenths of one percent of an unchlorinated polyvinylchloride dissolved in a solvent.

4. A process of improving tars for use in road construction and particularly their binding properties which comprises heating the tar to a temperature between about 100 and about 120° C. and adding to said tar a few tenths of one percent of an unchlorinated polyvinylchloride dissolved in anthracene oil.

5. A process of improving tars for use in road construction and particularly their binding properties which comprises heating the tar to a temperature between about 100 and about 120° C. and adding to said tar a few tenths of one percent of an unchlorinated polyvinylchloride of an M-number exceeding 10, dissolved in a solvent.

6. A process of improving tars for use in road construction and particularly their binding properties which comprises heating the tar to a temperature between about 100 and about 120° C. and adding to said tar a few tenths of one percent of an unchlorinated polyvinylchloride of an M-number exceeding 10, dissolved in anthracene oil.

7. A process of improving tars for use in road construction and particularly their binding properties which comprises adding to a heated tar a few tenths of one percent of an unchlorinated polyvinylchloride in the form of a powder while ensuring its dissolution in the tar by the application of mechanical means, the temperature of the tar corresponding to about 130° C. at atmospheric pressure and varying inversely with the pressure.

8. An improved binding agent, particularly for use in road construction, comprising a tar and a small quantity of an unchlorinated polyvinylchloride incorporated therewith.

9. An improved binding agent, particularly for use in road construction, comprising a tar and a few tenths of one percent of an unchlorinated polyvinylchloride incorporated therewith.

ALFRED SIROT.
GEORG WICK.